United States Patent [19]

Sloane

[11] 4,172,637
[45] Oct. 30, 1979

[54] COMMON BEAM APERTURE FOR DUAL BEAM SPECTROPHOTOMETERS

[75] Inventor: Howard J. Sloane, Fullerton, Calif.

[73] Assignee: Beckman Instruments, Inc., Fullerton, Calif.

[21] Appl. No.: 863,769

[22] Filed: Dec. 23, 1977

[51] Int. Cl.² ............................................. G05D 25/00
[52] U.S. Cl. ...................................... 350/273; 356/319
[58] Field of Search ................. 350/271, 273; 356/51, 356/88, 89, 93–97, 99, 100, 319–325

[56] References Cited

U.S. PATENT DOCUMENTS 3,011,389  12/1961  Siegler, Jr. ........................ 356/51 X
3,508,813  4/1970  Smith, Jr. et al. ................. 356/99 X Primary Examiner—F. L. Evans
Attorney, Agent, or Firm—Robert J. Steinmeyer; Robert R. Meads

[57] ABSTRACT

Apparatus compensating for "aperturing effects" produced when a sample holding aperture is incorporated in the sample beam of a conventional dual beam spectrophotometer to allow examination of very small size samples. Such effects usually take the form of undesired variations in the base line output of the spectrophotometer at wavelengths where the spectrophotometer slits open wider than the sample aperture in an attempt to produce a constant energy scan over a given spectrum. The apparatus comprises a second aperture optically equivalent to the sample aperture and located at a slit image point in a common beam portion of the spectrophotometer.

3 Claims, 5 Drawing Figures

COMMON BEAM APERTURE FOR DUAL BEAM SPECTROPHOTOMETERS

BACKGROUND OF THE INVENTION

In a double or dual beam spectrophotometer, a beam of light is split into two beams. In some instruments this is accomplished on a time share basis. Through a system of mirrors, the light beam is directed along a first path in which a sample can be inserted and a second path containing no sample. The first beam path is referred to as the sample beam and the second beam path is referred to as the reference beam. If a sample of material being less than opaque is inserted in the sample beam, part of the energy of the sample beam is absorbed by the sample material. The amount of energy absorbed is a function of the absorbance characteristics of the material in the sample beam and the particular wavelength of the sample beam. If sensitive instrumentation is provided to receive both the sample beam and the reference beam, the difference in energy between the sample beam and the reference beam can be measured. The difference between the two is indicative of the amount of energy absorbed by the sample. Since different light transmissive materials have different absorptive qualities to different wavelengths of light, a pattern representing the absorbance spectrum of the sample may be generated by subjecting the sample to a light beam which continuously varies in wavelength across or "scans" a predetermined light spectrum. Each material's absorbance spectrum is characteristic of that material in much the same manner as fingerprints or voice prints are characteristic of individual human beings. An operator trained to interpret such outputs can use the spectrophotometer for both qualitative and quantitative analysis.

In such a dual beam spectrophotometer, the absorbance of the sample is directly related to the weight per unit area through which the sample beam is passed. Therefore, the level of absorbance can be increased by increasing the sample size or reducing the sample beam area. This relationship takes on particular importance when examining very small size samples (microsamples), as when the quantity available for sampling is limited. If such a small sample is spread over a large beam area so as to increase the sample size, the absorbance may be too small to measure or, if measured and amplified to a point where it can be detected, the signal-to-noise ratio may be so low as to make the output unreliable. Accordingly, to increase absorbance levels when examining microsamples, it is common practice to reduce the sample beam area by placing the sample in a small aperture of an opaque support plate.

Also in such spectrophotometers, the amount of energy in the sample and reference beams changes at different frequencies or wavelengths within a scan because of variations in the optical efficiencies of the apparatus. In order to maintain the beam at constant energy levels, an adjustable slit is included in a portion of the optical train of the spectrophotometer where the beams are contained, i.e., in a common beam portion of the optical train. Since the energy per unit area varies with wavelength for a variety of reasons, the slit is normally programmed to open in the lower energy regions relative to the higher ones to enlarge the area of the common beam and thereby maintain the total energy of the component sample and reference beams at constant levels. Where (1) the slit width is programmed as a function of wavelength, and is narrower than a sample aperture placed in the sample beam as in FIGS. 1-A and B, and (2) no sample is placed in the aperture, the ratio of the intensity of the sample beam to reference beam remains virtually constant. However, at wavelengths where to maintain constant energy levels the slit program dictates a slit width wider than the sample aperture as in FIGS. 1-C and D, energy in the reference beam increases relative to that of the area limited sample beam and the ratio changes. In essence, energy is being removed in the sample beam by the aperture plate but not in the reference beam and the instrument records a decrease in transmittance at such wavelengths even though there is no actual sample absorption. Further, as the slit opens wider and wider (typically with increasing wavelength), the percentage of energy removed by the fixed area sample aperture plate becomes greater and greater. Such an "aperture effect" manifests itself as a variable 100% base line output from the spectrophotometer when no sample is present and affects the background absorption spectrum when a sample is placed in the sample beam. The aperture effect is depicted in FIG. 2 where the base line 16 is shown to drop off radically at the end of the scan spectrum where the slit opens wider than the sample aperture. With such an output, it becomes difficult for even a trained operator to make an accurate interpretation of the spectrum.

The problems of a variable base line are well recognized. Attempts have been made to provide compensation as typified by the recent patent to K. P. George (U.S. Pat. No. 3,986,776) entitled Automatic Baseline Compensator for Optical Absorption Spectroscopy. George teaches apparatus including adjustable signal attenuating means, calibration run means, magnetic tape recorder means, integrating means, and readback means to apply a compensating signal to the signal attenuating means in synchronism with the wavelength scan. While, in theory this apparatus should work for its intended purpose, it can be seen that a step increase is effected in both cost and complexity by its addition.

Therefore, it is the object of the present invention to provide a simple and effective means for restoring a more constant base line to facilitate analysis using dual beam spectrophotometers in the examination of microsamples where small apertures are required to be placed in the sample beam.

SUMMARY OF THE INVENTION

The present invention restores the base line and compensates for aperturing effects in dual beam spectrophotometers examining microsamples by providing a second or common beam aperture and at a slit image point in the common beam portion of the optical train of the spectrophotometer.

DESCRIPTION OF THE DRAWINGS

FIG. 1 illustrates the changes in areas of the sample and reference beams as the width of the spectrophotometer slit is varied from 1 mm to 7 mm. The sample beam area is limited by a sample aperture and represented by double cross-hatching.

DESCRIPTION OF THE PREFERRED EMBODIMENT

Figure 3:
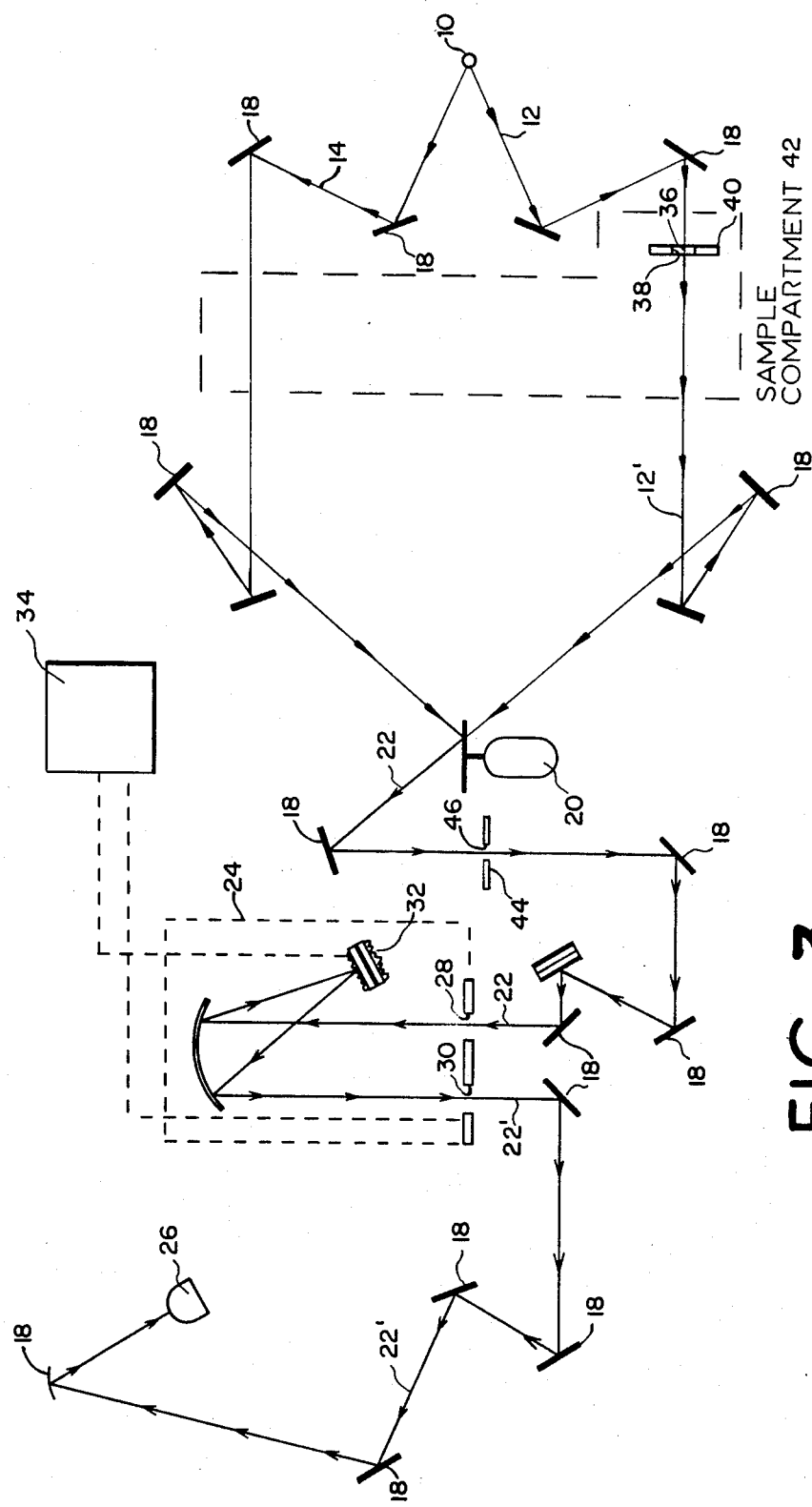
FIG. 3 is an optical diagram of a dual beam infrared spectrophotometer including the common beam aperture apparatus of the present invention.

As stated, FIG. 3 illustrates a simplified diagram of a basic dual beam spectrophotometer where the present invention is employed. A single broad spectrum source of light energy is provided at 10. Typically, light source 10 produces infrared (IR) light. Identical light from the source 10 is split in a conventional manner into a sample beam 12 and a reference beam 14. The light energy in beams 12 and 14 contains all the wavelengths that will be scanned. The two beams are directed by a plurality of substantially identical mirrors 18 toward a conventional light recombining means 20. Typically the recombining means comprises a rotating disk having alternating transparent and reflective segments so that, as shown in FIG. 3, the pulses of light in the sample beam 12 will pass through the transparent portions and the pulse of light in reference beam 14 will be reflected from the reflected segments whereby, as the disk rotates, a combined beam 22 will be formed of alternating linear segments of sample beam 12 and reference beam 14. The combined beam is then directed by further mirrors 18 through a conventional monochromator generally indicated as 24 and then to a radiation detector 26.

As is well understood, the function of the monochromator 24 is to receive the combined beam 22 through an adjustable entrance slit 28. The monochromator then operates on the beam 22 such that a combined beam 22' exiting an adjustable exit slit 30 contains a narrow and time varying band of wavelengths scanning the spectrum of light wavelengths included in the sample beam. To accomplish this, the monochromator includes a rotating grating 32 under the control of a conventional programming means 34. The adjustable entrance and exit slits 28 and 30 are also controlled by programming means 34 so that as the wavelength of the combined beam 22' emerging from the monochromator scans a light spectrum from a high frequency to a low frequency, the slits 28 and 30 are changed in size so that the energy level of the sample beam 12 and the reference beam 14 remains virtually constant.

Figure 1:
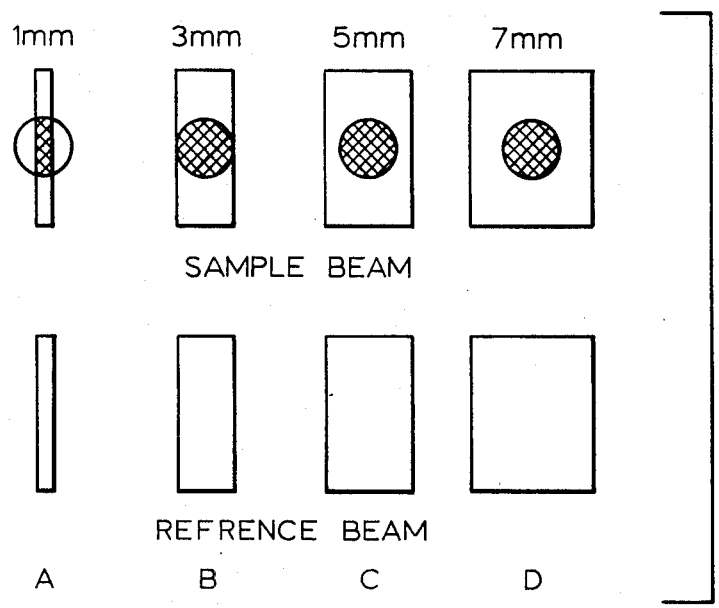
FIG. 1 is a diagrammatic representation of sample and reference beams in a dual beam spectrophotometer.

As previously stated, in dual beam spectrophotometers, such as illustrated in FIG. 3, the light transmissive test sample is located in the path of sample beam 12. Where, as here, the sample is small in size, it is customary to mount the sample in the aperture of an opaque mounting plate in a sample compartment. In FIG. 3, the sample is designated as 36, the aperture as 38, the plate as 40, and the compartment as 42. Further, the sample 36 is located at a focal point in the sample beam 12 between the source 10 and the light beam recombining means 20. Thus arranged, the aperture effects a reduction in the cross-sectional area of the sample beam to the size of the aperture. It is such a reduced size sample beam 12' which is recombined with the reference beam 14 at 20 and which is illustrated in FIG. 1 by the double cross-hatched lines.

Also, as previously indicated, when the slits 28 and 30 are programmed to have a width less than that of the aperture 38, the ratio of intensity of the sample to reference beams (in the absence of sample 36) remains virtually constant with changes in slit width (refer again to FIGS. 1-A and B). However, when the slits are programmed to have a width greater than that of the aperture as in FIGS. 1-C and D, energy in the reference beam increases relative to the sample beam which is limited in area by the aperture 38. In essence, energy is being removed in the sample beam by the aperture plate but not in the reference beam and the spectrophotometer records a decrease in transmittance at such wavelengths even though there is no actual sample absorption. Further, as the slit opens wider and wider (typically with increasing wavelengths), the percentage of energy removed by the fixed area sample aperture plate becomes greater and greater. Such an "aperture effect" manifests itself as a variable 100% or base line output from the spectrophotometer when no sample is present and affects the background absorption spectrum when a sample is placed in the sample beam. As previously noted, the aperture effect is depicted in FIG. 2 where the base line 16 is shown to drop radically at the end of the scan aperture where the slit opens wider than the sample aperture.

Obviously, if identical aperture plates were placed in the sample beam path and reference beam path, all changes in slit width would produce identical changes in both beams and the ratio of beam intensity would remain constant. However, such is impractical in dual beam spectrophotometers employing microsamples. In such apparatus, alignment of the optics, mirrors, slits, etc. so as to avoid distortion or differences in the data is a critical problem. Such critical optical problems when combined with the size constraints imposed by the microsample aperture make it nearly impossible to provide separate and identically sized and located apertures in the reference and sample beams.

Figure 2:
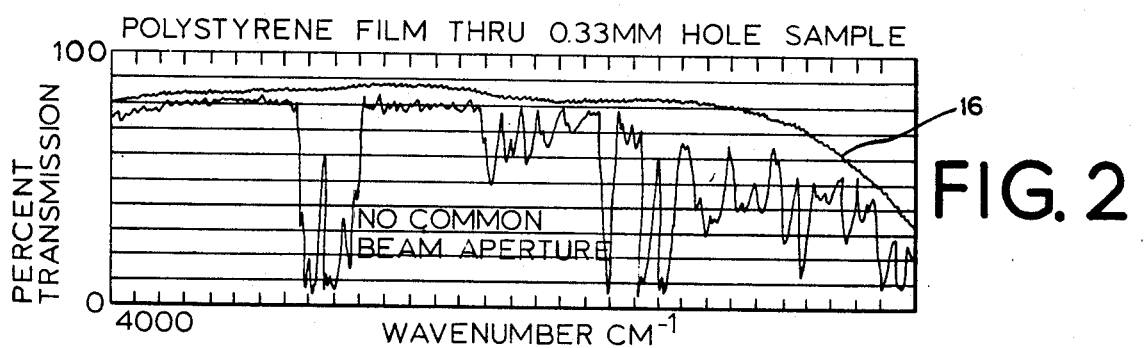
FIG. 2 is a graphic representation of the spectral output of a spectrophotometer scanning polystyrene film through a 0.33 millimeter aperture and having no means for base line leveling.
Figure 4:
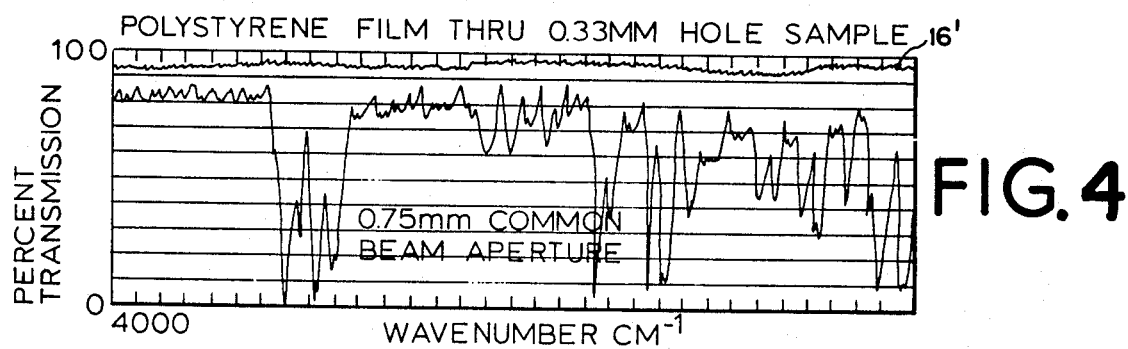
FIG. 4 is a graphic representation of the spectral output of a spectrophotometer scanning the same sample in the same manner as in FIG. 2 and having base line leveling as provided by the common beam aperture apparatus of the present invention.

As previously noted, with the aperture plate 40 disposed as represented in FIG. 3, the generated absorbance spectrum includes an unstable base line in wavelength regions where the programmed width of the slits 28 and of 30 is greater than that of the sample aperture—such instability being depicted in the base line 16 shown in FIG. 2. However, by employing a second aperture it is possible in accordance with the present invention to simultaneously and identically aperture both the sample beam 12 and reference beam 14 and thereby smooth the base line as shown in FIG. 4. As represented in FIG. 3, this is accomplished by providing a second or common beam aperture plate 44 in the combined beam 22. Preferably, the common beam aperture plate includes an aperture 46 located at a focal image point of slits 28 and/or 30 in the optical train of the combined beam 22 (slit image point) and optically equivalent to the aperture 38 in the aperture plate 40. Thus arranged, pulses of sample beam 12' and pulses of the reference beam 14 comprising combined beam 22 each pass through and are subject to identical aperturing restoring the proper ratio between the beams. The result is an absorbance spectrum for the sample 36 having a substantially straight base line 16' as represented in FIG. 4.

The actual size of the common beam aperture 46 may vary depending upon the aperturing introduced into the sample beam prior to the common beam plate 44. That is, the common beam aperture size will depend upon the size of the aperture 38 holding the microsample 36 in the sample beam and the size of the beam image at the sample. However, whatever the size of the sample holding aperture 38 and the beam image, the common beam aperture 46 must be fully optically equivalent to any aperturing introduced into the sample beam prior thereto. For example, it is common practice to use a beam condenser on the sample beam within the sample compartment. If, for sake of illustration, the beam condenser produces a reduction by a factor of 4 in the sample beam, the common beam aperture 46 should be four times as large as the sample aperture in order to be "optically equivalent". If no beam condenser is employed, the common beam aperture will be optically equivalent if equal in size to the sample holding aperture 38.

It is also important that the optically equivalent common beam aperture be positioned in the optical train where the sample and reference beams are common in space. This occurs at the location of the slit image where the beams are focused and are optically equivalent to the image found in the sample compartment.

Further, the form and shape of the common beam aperture 46 may vary depending on the form and shape of the sample holding aperture 38. For example, it may have a circular or rectangular shape. Typically, however, because of the method of preparing microsamples it is circular.

Moreover, for various applications, different size circular apertures may be preferred. In such the case, the common beam aperture 46 may take the form of a variable iris such as that used in a camera to control the aperture. Alternately, it may take the form of a wheel on which several different size holes are located. In any case, it would be a distinct convenience if the choice of aperture size in the common beam aperture 46 were made by operation of a control from the outside of the instrument.

Figure 5:
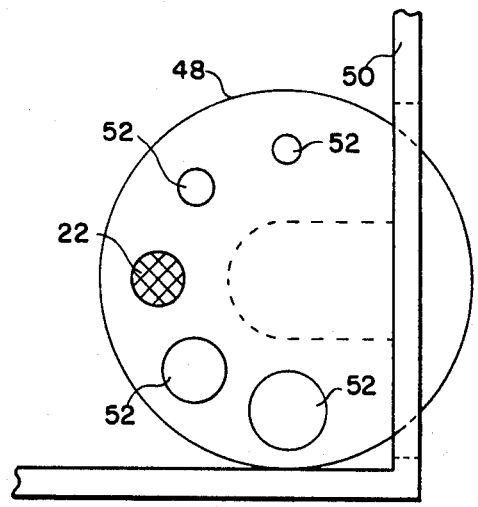
FIG. 5 is a diagrammatic and perspective representation of an adjustable common beam aperture apparatus which can be set by an operator from outside the spectrophotometer.

Referring to FIG. 5, one embodiment of such a variable aperture apparatus is shown. As illustrated, a rotatable wheel 48 is mounted for rotation with a portion thereof protruding outside the case 50 of the dual beam spectrophotometer. Thus arranged, the wheel may be rotated from position to position by hand or by motor. A series of circumferentially spaced holes 52 in various sizes are included in the wheel 48 such that different ones of the holes may be selectively positioned as the common beam aperture for the combined beam 22 as shown.

Having thus described my invention, I claim:

1. Apparatus compensating for aperturing effects produced when an aperture is incorporated in the sample beam of a conventional dual beam spectrophotometer reducing the sample beam cross-sectional area to allow examination of very small size sample, comprising:

a second aperture optically equivalent to the sample beam reducing aperture and located at a slit image point in a common beam portion of the spectrophotometer.

2. The apparatus of claim 1 wherein the second aperture is defined by variable aperture producing means.

3. The apparatus of claim 2 wherein said variable aperture producing means includes a plate containing a plurality of apertures of different size movable with respect to the common beam portion of the spectrophotometer to selectively locate an aperture of appropriate size optically equivalent to the sample beam reducing aperture at the slit image point in the common beam portion of the spectrophotometer.

* * * * *